(12) United States Patent
Kim et al.

(10) Patent No.: US 11,363,614 B2
(45) Date of Patent: Jun. 14, 2022

(54) SCHEDULING METHOD FOR GRANT-FREE MULTIPLE ACCESS, AND USER TERMINAL FOR SAME

(71) Applicant: INDUSTRY-ACADEMIC COOPERATION FOUNDATION, YONSEI UNIVERSITY, Seoul (KR)

(72) Inventors: Kwang-Soon Kim, Seoul (KR); Jong Hyun Kim, Seoul (KR)

(73) Assignee: INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 79 days.

(21) Appl. No.: 16/767,182

(22) PCT Filed: Nov. 28, 2018

(86) PCT No.: PCT/KR2018/014783
§ 371 (c)(1),
(2) Date: May 27, 2020

(87) PCT Pub. No.: WO2019/107897
PCT Pub. Date: Jun. 6, 2019

(65) Prior Publication Data
US 2020/0389906 A1    Dec. 10, 2020

(30) Foreign Application Priority Data

Nov. 28, 2017 (KR) .......................... 10-2017-0160976
Sep. 21, 2018 (KR) .......................... 10-2018-0113931
Nov. 21, 2018 (KR) .......................... 10-2018-0144312

(51) Int. Cl.
*H04W 72/12* (2009.01)
*H04W 72/08* (2009.01)

(52) U.S. Cl.
CPC .......... *H04W 72/121* (2013.01); *H04W 72/08* (2013.01); *H04W 72/1231* (2013.01); *H04W 72/1252* (2013.01); *H04W 72/1268* (2013.01)

(58) Field of Classification Search
CPC .............. H04W 72/121; H04W 72/08; H04W 72/1268; H04W 72/1231; H04W 72/1252;
(Continued)

(56) References Cited

U.S. PATENT DOCUMENTS

2007/0243879 A1    10/2007  Park et al.
2010/0208579 A1*   8/2010  Stephens .............. H04W 74/02
                                                                 370/216
(Continued)

FOREIGN PATENT DOCUMENTS

EP         2858446 A1      4/2015
KR    10-2008-0110838 A   12/2008
(Continued)

OTHER PUBLICATIONS

Choi et al., "Latency-Optimal Uplink Scheduling Policy in Training-based Large-Scale Antenna Systems," at https://arxiv.org/pdf/1607.07547, Jul. 26, 2016 (Year: 2016).*
(Continued)

*Primary Examiner* — Jutai Kao (57) ABSTRACT

A scheduling method for grant-free multiple access, and a user terminal for the same are disclosed. The method comprises: (a) a step of receiving, from the user terminal, information on traffic to be served, network information of the user terminal and state information of the user terminal; (b) a scheduling step of forming scheduling groups on the basis of the information received in step (a) and a step of allocating resources to each scheduling group; and (c) providing scheduling information to the user terminal, wherein traffic aggregations for traffic of the terminal are set
(Continued)

on the basis of the information on traffic from the terminal, the scheduling groups are formed according to the traffic aggregations, and the scheduling information is provided to each traffic aggregation by which the user terminal is to be served.

9 Claims, 7 Drawing Sheets

(58) Field of Classification Search
CPC ..... H04W 16/22; H04W 24/02; H04W 72/12; H04W 28/02
See application file for complete search history.

(56) References Cited

U.S. PATENT DOCUMENTS

2015/0085805 A1   3/2015   Li et al.
2019/0090262 A1*  3/2019   Yan .................... H04W 72/042

FOREIGN PATENT DOCUMENTS

KR   10-2009-0057572 A    6/2009
WO     2014-191039 A1    12/2014

OTHER PUBLICATIONS

Kim et al., "Grant-free Multiple Access for Ultra-Reliable Low-Latency Communications in a Large-Scale Antenna System," ICTC 2016 : The 7th International Conference on Information and Communication Technology Convergence (ICTC 2016), Oct. 19, 2016-Oct. 21, 2016 (Year: 2016).*

Kim, Jong Hyun et al., "Grant-free Uplink Scheduling for Ultra-reliable Low-latency Communications in a Large-Scale Antenna System", Proceeding of KICS Conference, The Korean Institute of Communications and Information Sciences(KICS), Jan. 2017 See p. 802.

International Search Report for International application No. PCT/KR2018/014783 (dated Mar. 11, 2019).

* cited by examiner

SCHEDULING METHOD FOR GRANT-FREE MULTIPLE ACCESS, AND USER TERMINAL FOR SAME

CROSS-REFERENCE TO RELATED APPLICATIONS

This application is a National Stage Entry of PCT International Application No. PCT/KR2018/014783, which was filed on Nov. 28, 2018, and which claims priority from and the benefit of Korean Patent Application No. 10-2017-0160976, filed with the Korean Intellectual Property Office on Nov. 28, 2017, Korean Patent Application No. 10-2018-0113931, filed with the Korean Intellectual Property Office on Sep. 21, 2018, and Korean Patent Application No. 10-2018-0144312, filed with the Korean Intellectual Property Office on Nov. 21, 2018. The disclosures of the above patent applications are incorporated herein by reference in their entirety.

BACKGROUND

1. Technical Field

The present disclosure relates to a scheduling method for grant-free multiple access and a user terminal for the same.

2. Description of the Related Art

In conventional mobile communication systems, including those for LTE (Long-Term Evolution), channel fluctuations between user terminals and the base station antenna may render predicting the performance of the channel very difficult or very inaccurate.

In such an environment, user scheduling necessarily requires acquiring accurate channel information in order to ensure a certain level of service quality for the user, and due to the properties of the channel fluctuating within a short duration of time in a mobile communication environment, a reference signal transmission procedure of a short cycle is inevitably required for scheduling.

Figure 1:
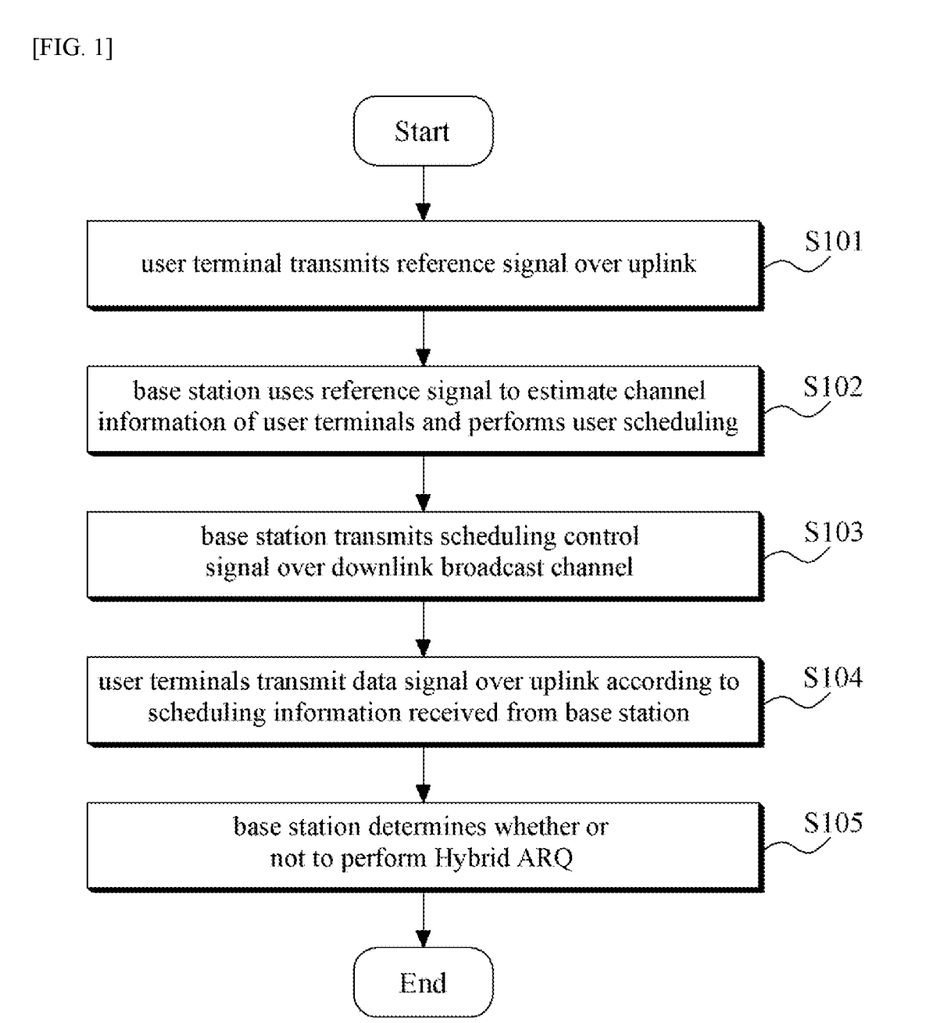
FIG. 1 is a flow diagram illustrating a user scheduling process according to the related art.

FIG. 1 is a flow diagram illustrating a user scheduling process according to the related art.

Incidentally, the process of FIG. 1 can apply to uplinks and TDD (time division duplex) downlinks.

In FIG. 1, user terminals desiring scheduling may transmit a reference signal (RS) designated with the base station over uplinks (operation S101).

Here, the number of reference signals and the number of corresponding resource elements (RE) required may be proportional to the number of user terminals desiring scheduling.

Incidentally, in the case of a FDD (frequency division duplex) system, the base station would transmit the reference signals over downlinks, and thus the number of resource elements may increase in proportion to the number of antennas at the base station.

After operation S101, the base station may use the reference signals received from the user terminals to estimate the channel information of the user terminals and may perform user scheduling based on the estimation (operation S102).

After operation S102, the base station may transmit control signals for user terminals of which scheduling has been determined over a PDCCH (physical downlink control channel) (operation S103).

Here, the scheduling information transmitted to the user terminals can include the indexes of the scheduled user terminals, the positions of the scheduled resource elements, the uplink transmission power, etc.

After operation S103, the user terminals may transmit data signals over uplinks according to the scheduling information received from the base station (operation S104).

After operation S104, the base station may determine whether or not to perform a hybrid ARQ (automatic repeat request) depending on whether or not the data signals received from the user terminals have been decoded normally (operation S105).

Such scheduling method based on the related art entails transmitting uplink reference signals before the scheduling and therefore requires a large number of uplink reference signals, so that consequently the spectral efficiency of the overall system may be lowered.

Also, since the uplink reference signals are transmitted before the scheduling, the channel information of user terminals that are not scheduled may be discarded may not be utilized, so that the energy efficiency of the user terminals may be lowered.

Furthermore, as resource allocation occurs at the subframe level, considerable delays are unavoidable.

SUMMARY OF THE INVENTION

The present disclosure, conceived to resolve the problems of the related art described above, provides a scheduling method and a user terminal for grant-free multiple access with which to provide low-latency and high-reliability services.

Also, the present disclosure provides a scheduling method and a user terminal for grant-free multiple access that can minimize performance degradations caused by interference while providing low-latency performance in various traffic environments.

One aspect of the present disclosure provides a scheduling method for grant-free multiple access that includes: (a) receiving traffic information, which is associated with traffic of which servicing is desired, network information of the user terminal, and status information of the user terminal, from user terminals; (b) performing scheduling based on information received in step (a), where the scheduling includes forming scheduling groups and allocating resources to each scheduling group; and (c) providing scheduling information to the user terminal, where traffic sets are configured for the traffic of the terminals based on the traffic information from the user terminals, the scheduling groups are formed according to the traffic sets, and the scheduling information is provided according to each traffic set of which servicing is desired by the user terminal.

Step (b) may include forming the scheduling groups by generating a multiple number of candidate scheduling group sets and selecting one scheduling group set from among the multiple candidate scheduling group sets based on an average spectral efficiency.

The network information of the user terminal may include long-term channel information of the user-terminal, the status information of the user terminal may include energy information associated with energy consumed in using a unit resource block, and step (b) may include sorting user terminals based on the long-term channel information and energy information of user terminals within a serving cell and generating the candidate scheduling group sets by using the sorted user terminals.

The average spectral efficiency may be computed based on the spectral efficiency of each scheduling group, where the spectral efficiency of each scheduling group may be computed based on a SINR computed for each user terminal belonging to the scheduling groups in each of the candidate scheduling group sets.

The SINR of a user terminal belonging to the scheduling group may be computed by incorporating an upper limit on the number of active users belonging to the same scheduling group.

A cumulative distribution function of a number of packet generations may be obtained according to packet generation probabilities of user terminals within the same scheduling group, and the upper limit of the number of active users belonging to the same scheduling group may be configured based on the obtained cumulative distribution function and a traffic reliability upper limit.

The SINR for each user terminal is computed by an equation shown below:

$$\tilde{\gamma}_j[f;t] = \frac{p_j^{dt}\beta_j|g_j^H\hat{h}_j|^2}{\|g_j\|^2(1+\sigma_{tr}^2\sum_{k\in O_q}p_k^{dt}\beta_k)+\sum_{k\in O_q\setminus\{j\}}p_k^{dt}\beta_k|g_j^H\hat{h}_j|^2}$$

$$\gamma_k[f;t] = \frac{(1+\sigma_{tr}^2)(M-J)p_k^{dt}\beta_k}{1+\sigma_{tr}^2\sum_{j\in O_q}p_j^{dt}\beta_j}$$

$$= \frac{(1+\sigma_{tr}^2)(M-J)(E_k\beta_k - L\overline{p}_q^{tr})}{(N-L)+\sigma_{tr}^2(E_k\beta_k - L\overline{p}_q^{tr})}$$

where $\gamma_j[f; t]$ represents the SINK of user terminal j at sub-band f and subframe t, $\beta_j$ is the long-term channel information of user terminal j, $E_k$ is the energy information of k (energy consumed for each unit resource block), $p_j^{tr}$ and $p_j^{dt}$ represent the transmission powers of a pilot signal and a data signal, respectively, $h_j$ is the short-term channel information of user j, $g_j$ is the receive combiner of user j, $\sigma_{tr}^2$ is the variance of channel estimation error for a pilot, $O_q$ represents the q-th scheduling group, M is the number of base station antennas, N is the number symbols of a resource block, L is the length of the pilot, J is the upper limit of the number of other active users within the same scheduling group, and $\overline{p}_q^{tr}$ represents the target pilot power upon arriving at a base station for scheduling group q.

Step (b) may be performed for each of a multiple number of candidate pilot signals having different lengths and may include determining simultaneously the pilot of an optimal length, the transmission power, and the scheduling groups.

The user terminal may transmit a data signal in a grant-free manner by using the allocated resources.

Step (a) may be performed during a cell association step.

Another aspect of the present disclosure provides a user terminal for grant-free multiple access that includes: a cell association part configured to perform cell association while providing traffic information, device channel information, and energy information to a base station, the traffic information associated with traffic of which servicing is desired, the energy information associated with energy consumed in using a unit resource block; a scheduling information receiver part configured to receive, from the base station, scheduling group information for each of traffic sets configured in relation to traffic of which servicing is desired by the terminal, allocated resource information associated with resources allocated to scheduling groups according to the traffic sets, a pilot signal for each traffic set, and transmission power information for each traffic set; and a data communication part configured to transmit data in a grant-free manner to the base station by using the allocated resource information and the pilot signal for each of the traffic sets.

An embodiment of the present disclosure can efficiently ensure the QoS required of services while providing low-latency performance in grant-free multiple access for various traffic corresponding to low-latency and high-reliability services.

DETAILED DESCRIPTION OF THE INVENTION

The present disclosure will be described below with reference to the accompanying drawings. However, the present disclosure can be implemented in various different forms and thus is not limited to the embodiments described herein.

For a clearer understanding of the present disclosure, certain parts that are of less relevance to the descriptions have been omitted in the drawings. Throughout the specification, similar reference numerals have been designated to similar elements.

Throughout the specification, reference to a part being "connected" to another part is not limited to meaning "directly connected" but also encompasses "indirectly connected" cases in which there are one or more other members interposed in-between.

Also, when a part is referred to as "including" an element, this does not preclude the presence of other elements, unless specifically stated otherwise, but rather should be interpreted as meaning that one or more other elements can further be included.

Certain embodiments of the present disclosure are described below in more detail, with reference to the accompanying drawings.

Figure 2:
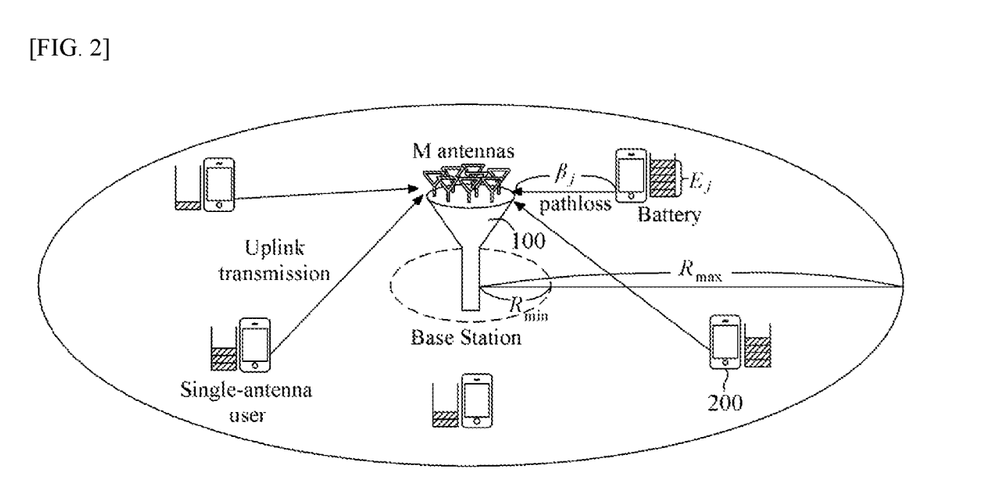
FIG. 2 is a diagram illustrating the structure of a wireless communication system to which a scheduling method according to an embodiment of the present disclosure may be applied.

FIG. 2 is a diagram illustrating the structure of a wireless communication system to which a scheduling method according to an embodiment of the present disclosure may be applied.

A mobile communication system according to an embodiment of the present disclosure can be based in a massive MIMO environment and can include multiple base stations, multiple user terminals, and a network entity.

Incidentally, the network entity can be implemented as an arbitrary node of a core network or a base station and can determine uplink/downlink user scheduling using information collected from the base stations.

Also, each of the base stations can have at least one serving cell. If carrier aggregation is configured, whereby several different frequency bands are bundled together to be used similarly to one frequency, multiple serving cells can be configured for one base station.

For example, one primary cell and one or more secondary cells can be configured for one base station.

For convenience, FIG. 2 illustrates a case in which there are one base station 100 and a multiple number of user terminals 200 that receive scheduling information from the base station 100, where the multiple user terminals 200 perform uplink communication with the base station 100 simultaneously.

The base station 100 can acquire the network information of user terminals 200 using physical uplink shared channel (hereinafter referred to as 'PUSCH') signals received from user terminals 200 present within the serving cell and preferably can acquire long-term channel state fading information (hereinafter referred to as 'long-term channel information').

In a massive MIMO environment, an increased number of antennas at the base station 100 can render the fluctuations between the user terminals 200 and the antennas of the base station 100 negligible. That is, in a massive MIMO environment, the long-term channel information can be acquired from just the fading information between the user terminals 200 and the antennas of the base station 100.

This can be seen from the equation of favorable propagation used for transmissions and receptions in a massive MIMO environment, shown as Equation 1 below.

$$\frac{1}{M} G_l G_l^H \stackrel{M=K}{=} D_l \quad \text{[Equation 1]}$$

Here, M is the number of antennas of the base station 100, K is the number of user terminals 200, $G_l$ is a K×M matrix and is the channel between the l-th base station 100 antenna and the user terminal 200, and $D_l$ is a diagonal matrix of which the (k,k)-element is $\beta_{jk}$.

Also, $\beta_{jk}$ is the large-scale fading or average channel power between the l-th base station 100 and the k-th user terminal 200.

Incidentally, $G_l$ includes both small-scale fading and large-scale fading between the antenna of the base station 100 and the user terminal 200.

Equation 1 shown above means that the greater the number of antennas of the base station 100, the fluctuations in the channel between the user terminal 200 and the base station 100 antenna can be ignored.

In other words, the performance of a channel between a base station 100 antenna and a user terminal 200 can be predicted from the channel's large-scale fading information.

Also, the base station 100 can include the status information of the user terminals 200 and preferably can acquire energy information.

Here, 'energy information' may represent the energy consumed for using a unit resource block (RB) for communication by a user terminal 200 with the base station 100.

Incidentally, the energy information can change according to the battery status, charging process, or power consumption policy, etc., of the user terminal 200, but such changes are extremely small or negligible in the context of the present disclosure which considers long-term channels.

Further, the base station 100 may receive traffic information from the user terminals 200 regarding traffic usable by the user terminals.

The base station 100 may classify the user terminals 200 located within the serving cell into a multiple number of scheduling groups by using the long-term channel information, energy information, and traffic information. Here, user terminals 200 belonging to the same scheduling group may use the same uplink target pilot transmission power.

Here, the base station 100 can determine the allocation ratio of uplink transmission powers for the pilot signal and data signal for each user terminal 200 belonging to the same scheduling group.

Also, the base station 100 may perform scheduling, based on the data rate of each scheduling group, including determining the resource block usage rate for each scheduling group and the resources available for each scheduling group.

A more detailed description of the scheduling method is provided below with reference to separate drawings, where the present disclosure enables user terminals 200 to perform communication in a grant-free manner by using resources allocated from the base station 100.

Figure 3:
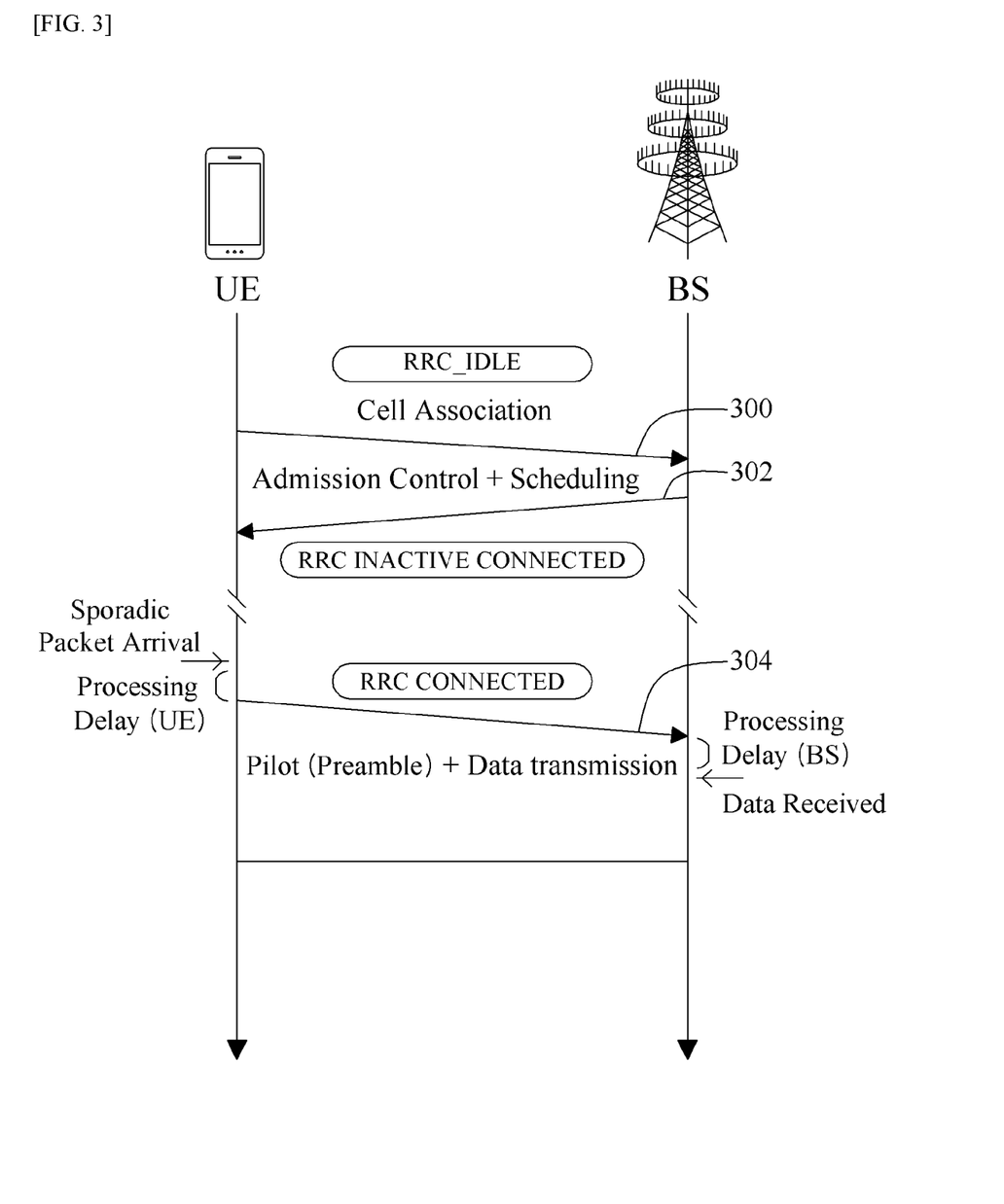
FIG. 3 is a flowchart illustrating the operational structure of a wireless communication system to which a scheduling method according to an embodiment of the present disclosure may be applied.

FIG. 3 is a flowchart illustrating the operational structure of a wireless communication system to which a scheduling method according to an embodiment of the present disclosure may be applied. FIG. 3 illustrates the operational structure of a wireless communication system that operates in a grant-free manner.

Referring to FIG. 3, a user terminal 200 may enter the serving cell area of a base station 100 and perform cell association with the base station (step 300).

In the cell association step, the information transmitted by the terminal to the base station may include traffic information, long-term channel information, and energy information.

The traffic information of a terminal may include predetermined traffic ID information. For example, if the user terminal 200 is a terminal capable only of voice communication, the user terminal 200 may transmit a traffic ID concerning voice communication to the base station 100. In another example, if the user terminal 200 is a terminal capable of voice communication, data communication, and VR communication, an ID regarding all three traffic types may be transmitted to the base station 100 during cell association.

Information regarding the QoS, reliability, delay time, packet capacity, and packet generation probability can be predefined for each traffic type.

As described later on, the scheduling of the present disclosure may be performed according to traffic type, and to this end, the user terminal 200 may transmit the traffic information usable during the cell association step.

Also, the long-term channel information can be defined as the long-term average fading information for the terminal and base station, as described above, and the user terminal 200 can obtain the long-term channel information in various ways. For example, the long-term channel information can be acquired by using a predefined signal.

Further, the energy information may be information on the energy consumed when using a unit resource block for communication, as described above. Since the same type of terminal can have the same energy information, it would be possible to transmit information on the type of terminal instead of the energy information.

Upon receiving the three types of information from the user terminal 200, the base station 100 may use the information received from the terminal to perform scheduling, which entails determining the resources that are to be used by the user terminal, and may transmit the scheduling information together with information regarding approval of the terminal's cell association to the user terminal 200 (step 302).

The present disclosure allows grant-free communication between the user terminal 200 and the base station 100, and as such, the scheduling information may be provided during the cell association step. Of course, the scheduling information can also be provided at a different time other than the cell association step.

After receiving the cell association approval and the scheduling information, the user terminal 200 may, when data transmission is needed, transmit data without separate permission by using the scheduled resources (step 304).

The user terminal 200 may transmit the pilot signal and the data signal together in a grant-free manner, where the length of the pilot signal used may be determined beforehand by the base station during scheduling.

Such a grant-free communication method can implement lower latency communication compared to the existing method of providing information on the resources that are to be used every time there is a packet for transmitting, but since the resource information is provided prior to data transmission, various problems can occur. In particular, in cases where too many users use resources together at once, interference may pose a great problem.

The present disclosure provides such a scheduling method for grant-free communication that can implement low latency, and a more detailed description of a scheduling method based on the present disclosure is provided below.

The present disclosure determines the length of the pilot to be used by the user terminal, the transmission power, the scheduling group configuration for the user terminal, and the resources to be used by the scheduling group, for use in grant-free communication through scheduling.

Figure 4:
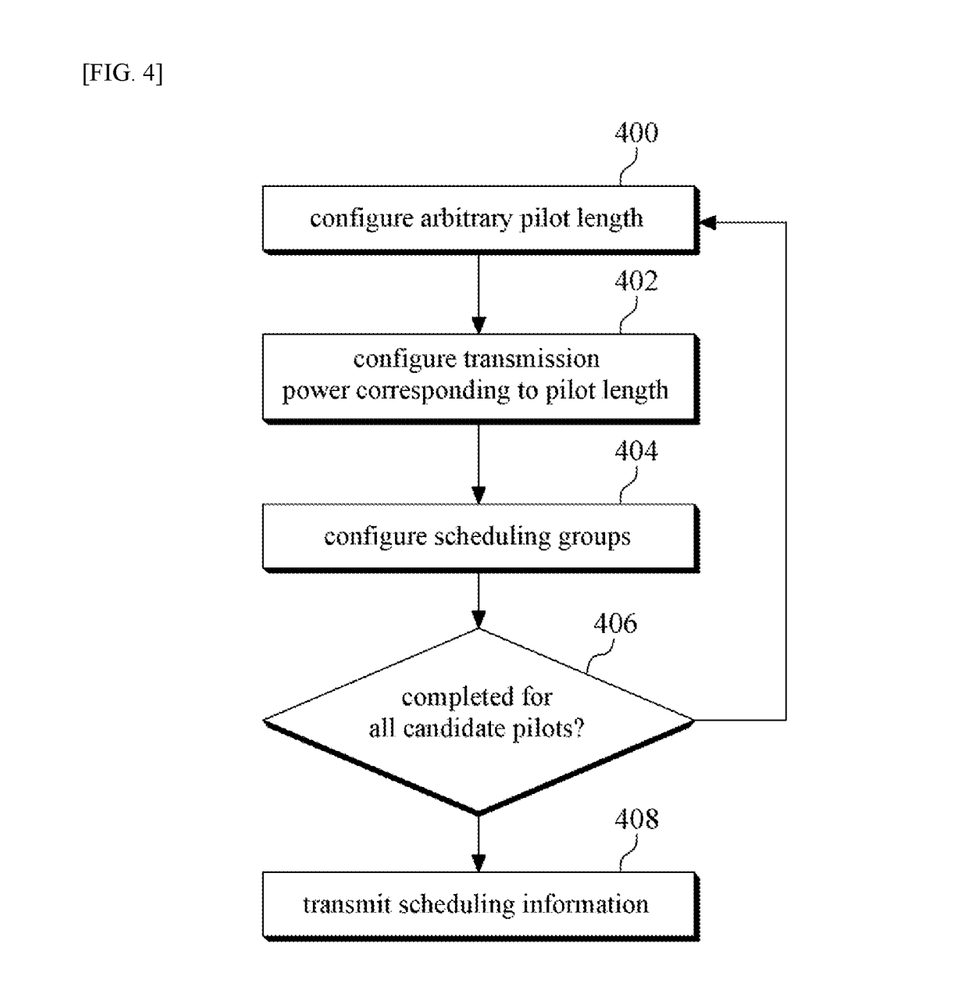
FIG. 4 is a flowchart illustrating a scheduling method according to an embodiment of the present disclosure.

FIG. 4 is a flowchart illustrating a scheduling method according to an embodiment of the present disclosure.

The scheduling illustrated in FIG. 4 may be performed for each traffic type. FIG. 4 shows a scheduling method for any one traffic type, and in cases where a user terminal supports communication for multiple types of traffic, the scheduling illustrated in FIG. 4 may be performed for each traffic type, and the user terminal may be provided with scheduling information for each of the multiple traffic types from the base station.

Referring to FIG. 4, first, an arbitrary pilot length may be configured from among a multiple number of candidate pilot lengths (step 400). The scheduling method of the present disclosure may be performed according to pilot length. That is, steps 402 to 404 may be repeated for each pilot length, and the optimal pilot length, transmission power, and scheduling group may be determined together.

When an arbitrary pilot length is configured, the transmission power corresponding to the configured pilot length may be configured (step 402). The transmission power can be determined based on the long-term channel information and energy information obtained during the cell association request procedure. Preferably, the transmission power for the pilot signal and the transmission power for the data signal can be determined independently.

When the pilot length and the transmission power have been configured, the scheduling group to which the user terminal will belong may be configured, and the resources which the corresponding scheduling group will use may be determined (step 404). The present disclosure may configure scheduling groups for terminals present within the serving cell of the base station for each traffic type, and a terminal that has connected to the base station may be assigned to any one scheduling group through this procedure.

A more detailed description on the specific method of configuring the scheduling groups and determining the resources to be used by the scheduling groups is provided later with reference to FIG. 5.

When optimal scheduling groups are configured for a particular pilot length, then step 402 to step 404 may be repeated for all pilot length candidates (step 406).

When scheduling is completed through the process above, the base station may transmit the scheduling information to the user terminals (step 408). More specifically, the scheduling information transmitted to the user terminal by the base station may include communication resource information (time information and frequency information) for each traffic type that will be used by the terminal, the transmission power for each traffic type of the terminal, and the pilot signal for each traffic type of the terminal. As described above, the transmission power for each traffic type may preferably be configured independently for the transmission power for the pilot and the transmission power for the data.

Figure 5:
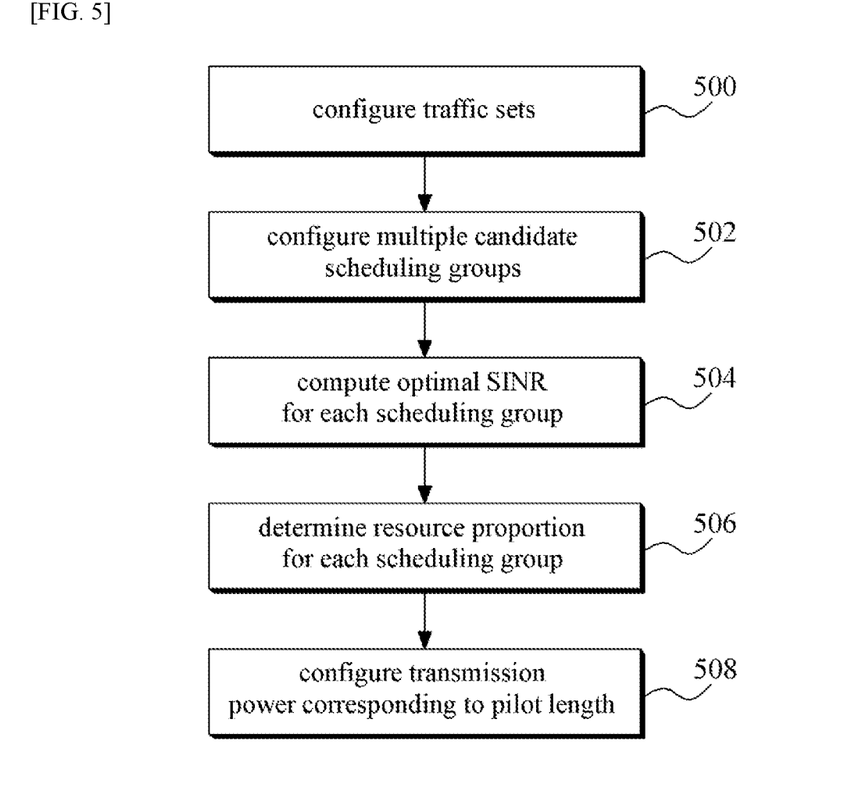
FIG. 5 is a flowchart illustrating the procedures for configuring scheduling groups according to an embodiment of the present disclosure.

FIG. 5 is a flowchart illustrating the procedures for configuring scheduling groups according to an embodiment of the present disclosure.

Referring to 5, first, traffic sets may be configured for each traffic ID of the terminal (step 500). As described above, an embodiment of the present disclosure can have the scheduling groups may formed according to traffic type, and traffic sets may first be configured in order to configure the scheduling group for each traffic type. According to a preferred embodiment of the present disclosure, traffic types having similar QoS may be included in the same traffic set.

When the traffic sets are configured, then for each traffic set, the user terminals of the traffic set may be sorted according to a value obtained based on a product of the long-term channel information and an energy condition. That is, defining the long-term channel information of user terminal j as $\beta_j$, and defining the energy information as $E_j$, the user terminals may be sorted according to $\beta_j E_j$.

When the user terminals are sorted, a multiple number of candidate scheduling group sets may be configured based on the sorted order (step 502). The present disclosure may include user terminals having similar properties in the same scheduling group and, to this end, may sort the user terminals based on the energy information and long-term channel information and configure multiple candidate scheduling groups based on the sorted order.

The multiple candidate scheduling group sets may be configured while adjusting the total number of scheduling groups and the size of each scheduling group with respect to the total user terminals.

For example, supposing that there are ten user terminals for a particular traffic type and that these have been sorted in the order of 1 to 10, the candidate scheduling group sets can be configured as follows:

first candidate scheduling group set: {1,2,3}, {4,5,6,7,8}, {9,10}, second candidate scheduling group set: {1,2,3}, {4,5,6,7}, {8,9,10}, third candidate scheduling group set: {1,2}, {3,4}, {5,6}, {7,8,9,10}.

Of course, besides the candidate scheduling group sets above, it is possible to configure a greater number of candidate scheduling group sets by adjusting the size and total number of the groups, and the candidate scheduling group sets may be configured for various possible combinations or all possible combinations. A grouped entity such as {1,2,3} in the example above is defined herein as a scheduling group.

When the candidate scheduling groups are configured, the optimal SINK may be computed for each scheduling group of each candidate scheduling group set (step 504). The optimal SINR for each scheduling group may be computed with respect to the user terminal having the lowest value of $\beta_j E_j$ from among the user terminals belonging to the scheduling group.

According to an embodiment of the present disclosure, the optimal SINR for each scheduling group of each candidate scheduling group set can be computed as Equation 2 shown below, where the SINR of Equation 2 may be computed for the user terminal having the lowest value of $\beta_j E_j$ as described above.

$$\tilde{\gamma}_j[f;t] = \frac{p_j^{dt}\beta_j|g_j^H\hat{h}_j|^2}{\|g_j\|^2(1+\sigma_{tr}^2\Sigma_{k\in O_q}p_k^{dt}\beta_k) + \sum_{k\in O_q\setminus\{j\}}p_k^{dt}\beta_k|g_j^H\hat{h}_j|^2} \quad \text{[Equation 2]}$$

$$\gamma_k[f;t] = \frac{(1+\sigma_{tr}^2)(M-J)p_k^{dt}\beta_k}{1+\sigma_{tr}^2\Sigma_{j\in O_q}p_j^{dt}\beta_j}$$
$$= \frac{(1+\sigma_{tr}^2)(M-J)(E_k\beta_k - L\bar{p}_q^{tr})}{(N-L)+\sigma_{tr}^2(E_k\beta_k - L\bar{p}_q^{tr})}$$

In Equation 2, $\gamma_j[f;t]$ represents the SINR of user terminal j at sub-band f and subframe t, $\beta_j$ is the long-term channel information of user terminal j, $E_k$ is the energy information of k (energy consumed for each unit resource block), $p_j^{tr}$ and $p_j^{dt}$ represent the transmission powers of a pilot signal and a data signal, respectively, $h_j$ is the short-term channel information of user j, $g_j$ is the receive combiner of user j, $\sigma_{tr}^2$ is the variance of channel estimation error for a pilot, $\mathcal{O}_q$ represents the q-th scheduling group, M is the number of base station antennas, N is the number symbols of a resource block, L is the length of the pilot, J is the upper limit of the number of other active users within the same scheduling group, and $\bar{p}_q^{tr}$ represents the target pilot power upon arriving at a base station for scheduling group q.

In terms of computing the SINR for configuring the scheduling groups, the present disclosure differs from existing methods of SINR computation in that the upper limit J on the number of active users is incorporated in the computation of the SINR. The upper limit on the number of active users may be computed by obtaining a cumulative distribution function for the number of packet generations within a scheduling group based on the packet generation probabilities of a traffic type for user terminals within the scheduling group and computing the upper limit on the number of active users for satisfying a reliability condition of the traffic type in the cumulative distribution function. In the present disclosure, the upper limit on the number of active users computed in this manner may be incorporated in the computation of the SINR.

Also, the present disclosure may incorporate a variance of channel estimation error, which is associated with a correlation performance between pilots divided up among users within a scheduling group, in the computation of the SINR. The variance of channel estimation error may be computed as Equation 3 shown below.

$$\sigma_{tr}^2\left(1-\frac{L}{J}\right)+\frac{1}{J}\sum_{i=1}^{\min\{L,J\}}\frac{1}{1+L\bar{p}_q^{tr}\lambda_i} \quad \text{[Equation 3]}$$

In Equation 3 above, $\lambda_i$ is an eigenvalue of an autocorrelation matrix $\Psi\Psi^H$ of the pilot, $\bar{p}^{tr}$ is the target pilot power, L is the length of the pilot, and J is the upper limit of the number of other active users within the same scheduling group.

In the present disclosure, when resource allocation is performed, the user my use the allocated resources without a separate grant procedure, meaning that there is a possibility that the use of resources may cause interference with other users. In order to compute the SINR for such a case, the present disclosure may compute the SINR by additionally incorporating the upper limit on the number of other active users within the same scheduling group and the variance of channel estimation error associated with correlation performance between pilots.

When the SINR is computed for each scheduling group, the proportion of resources that are to be allocated may be determined for each scheduling group (step 506). From among the total amount of resources, the proportion of resources to be allocated to a particular scheduling group may be determined using the computed SINR and the spectral efficiency for each candidate scheduling group.

For instance, the proportion of resources to be allocated to each scheduling group can be configured as Equation 4 shown below.

$$D_q = \frac{(\Omega_q^\star(\mathcal{O}_q,L))^{-1}}{\sum_{i\in Q}(\Omega_i^\star(\mathcal{O}_i,L))^{-1}}, \forall q \in Q, \quad \text{[Equation 4]}$$

$D_q$ represents the proportion of resources allocated to scheduling group q from among the total resources, Q represents all scheduling groups, and $\Omega^*(\mathcal{O}_q, L)$ represents the maximum spectral efficiency scheduling group q has for pilot length L.

When the proportion of allocated resources is determined for each scheduling group, then the average spectral efficiency of all scheduling groups in one candidate scheduling group set may be calculated, and the resources to be allocated to each scheduling group for satisfying the packet capacities required by the traffic may be determined (step 508).

The maximum average spectral efficiency of all scheduling groups can be calculated as Equation 5 shown below.

$$SE_{(L)}^\star = \frac{1-\frac{L}{N}}{\eta}\frac{1}{\sum_{i\in Q}(\Omega_i^\star(\mathcal{O}_i,L))^{-1}} \quad \text{[Equation 5]}$$

Step 504 to step 508 may be performed for every candidate scheduling group set, and the candidate scheduling group set yielding the highest average spectral efficiency of all scheduling groups may be selected to configure the scheduling groups (step 510).

As described with reference to FIG. 4, the configuring of scheduling groups in FIG. 5 may be performed for each candidate pilot length, and the scheduling group set having the highest average spectral efficiency and the pilot length corresponding thereto may be ultimately selected.

Figure 6:
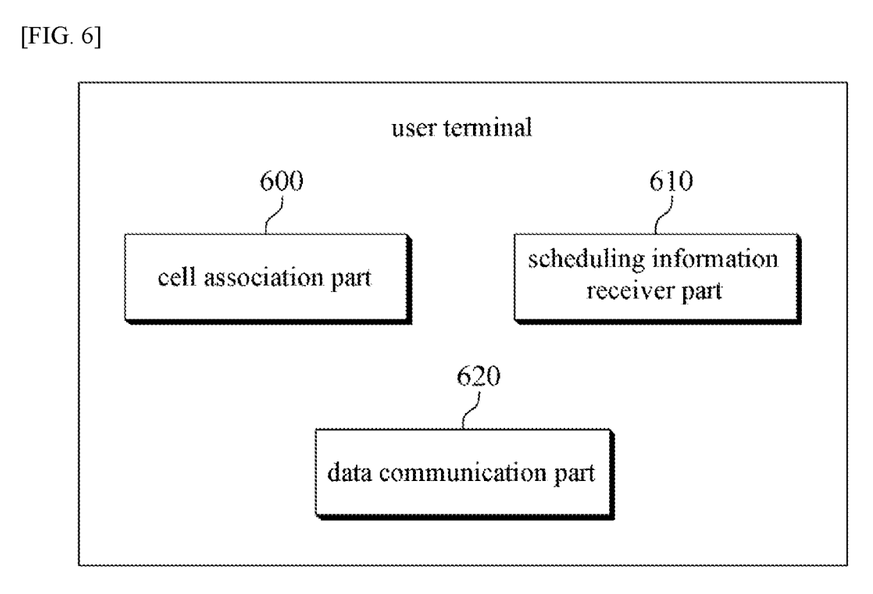
FIG. 6 is a block diagram illustrating the structure of a user terminal for performing scheduling according to an embodiment of the present disclosure.

FIG. 6 is a block diagram illustrating the structure of a user terminal for performing scheduling according to an embodiment of the present disclosure.

Referring to FIG. 6, a user terminal according to an embodiment of the present disclosure may include a cell association part 600, a scheduling information receiver part 610, and a data communication part 620.

The cell association part 600 may perform the connection with the base station if the user terminal enters the serving cell area of the base station. During the cell association process, the cell association part 600 may provide the base station with the traffic ID regarding the traffic with which to be serviced, the long-term channel information between the base station and the user terminal, and the energy information regarding the energy consumed in using a unit resource element.

The scheduling information receiver part 610 may receive the scheduling information from the base station. As described above, the scheduling information may include communication resource information regarding communication resources allocated for each type of traffic, transmission power information (data transmission power and pilot transmission power) for each type of traffic, and a pilot signal for each type of traffic.

The data communication part 620 may perform data communication with the base station based on the scheduling information provided from the base station. As described above, the data communication part may select one of the allocated resources, without a separate grant procedure from the base station, to transmit data. The data signal may include the pilot signal allocated from the base station as it is transmitted.

Figure 7:
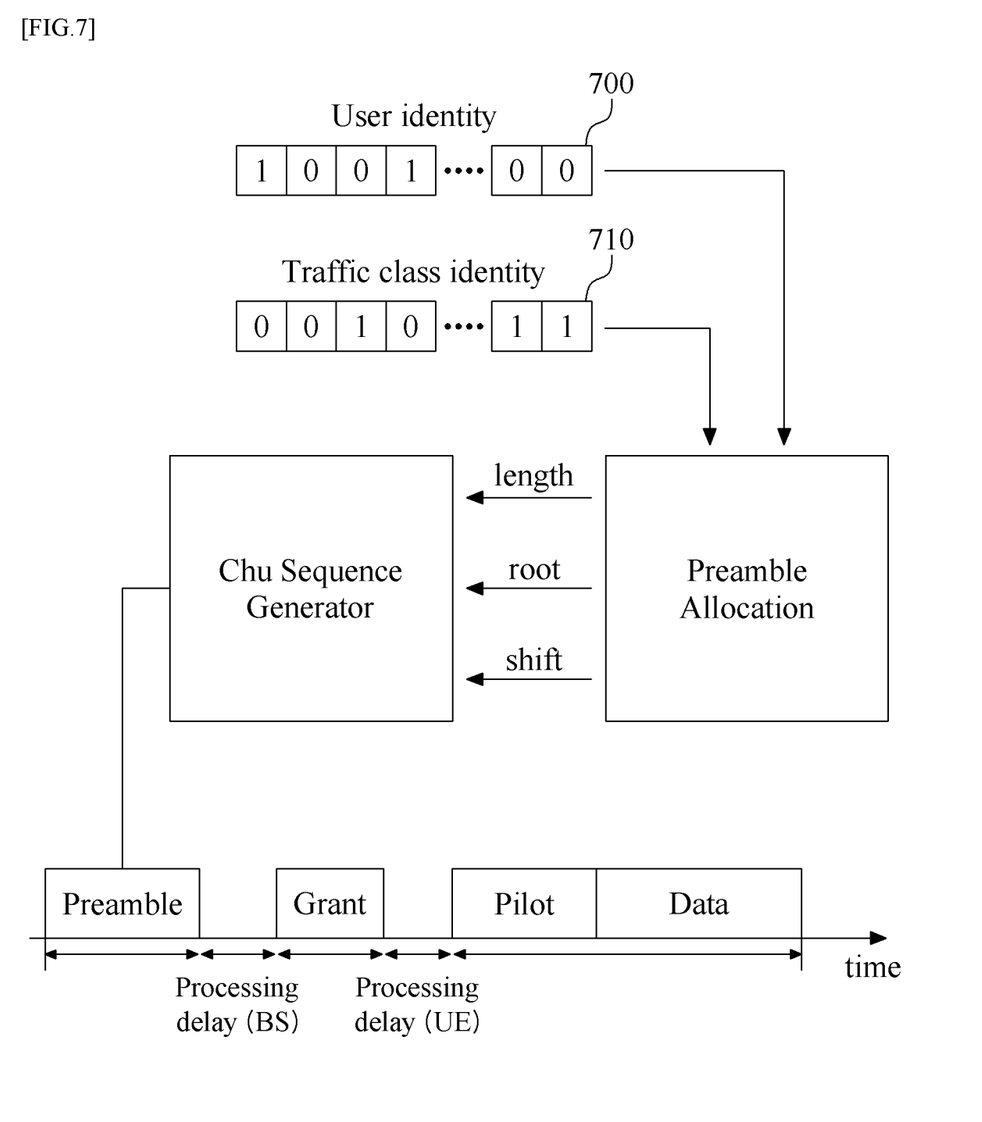
FIG. 7 is a diagram illustrating the structure of a preamble included in a cell association request signal transmitted by a user terminal according to an embodiment of the present disclosure.

FIG. 7 is a diagram illustrating the structure of a preamble included in a cell association request signal transmitted by a user terminal according to an embodiment of the present disclosure.

Referring to FIG. 7, a preamble according to an embodiment of the present disclosure may include user ID information 700 and traffic ID information 710. The user ID information 700 may be identification information uniquely assigned to a user terminal, and the traffic ID information 710 may be ID information defined beforehand for the traffic types with which the user terminal is to be serviced. If servicing by multiple traffic types is desired, multiple pieces of traffic ID information may be included in the preamble.

Unlike the preamble used in existing random access, etc., the present disclosure may include traffic ID information, and the base station may perform scheduling for the user terminal according to traffic type by using the traffic ID information included in the preamble.

The descriptions of the present disclosure provided above are for illustrative purposes only, and the person having ordinary skill in the field of art to which the present disclosure pertains would understand that various specific implementations can be derived without departing from the technical spirit or essential features of the present disclosure.

Thus, the embodiments described above are illustrative in all aspects and do not limit the present disclosure.

In some examples, an element described as a single part can be practiced in a distributed form, and likewise, elements described as a distributed form can be practiced in an integrated form.

The scope of the present disclosure is defined by the scope of claims set forth below, and all modifications or variations derived from the interpretation and scope of the claims and their equivalent concepts are to be interpreted as being encompassed within the scope of the present disclosure.

What is claimed is:

1. A scheduling method for grant-free multiple access, the scheduling method comprising:
    (a) receiving, from a user terminal, traffic information associated with traffic of which servicing is desired, network information of the user terminal, and status information of the user terminal;
    (b) scheduling based on the traffic information, the network information, and the status information received in said step (a), the scheduling comprising forming scheduling groups and allocating resources to each scheduling group; and
    (c) providing scheduling information to the user terminal, wherein traffic sets are configured for traffic of terminals based on the traffic information from the user terminal, the scheduling groups are formed according to the traffic sets, and the scheduling information is provided according to each traffic set of which servicing is desired by the user terminal,
    wherein a cumulative distribution function of a number of packet generations is obtained according to packet generation probabilities of user terminals within a same scheduling group, and an upper limit of a number of active users belonging to the same scheduling group is configured based on the obtained cumulative distribution function and a traffic reliability upper limit.

2. The scheduling method for grant-free multiple access according to claim 1, wherein said step (b) comprises forming the scheduling groups by generating a plurality of candidate scheduling group sets and selecting one scheduling group set from among the plurality of candidate scheduling group sets based on an average spectral efficiency.

3. The scheduling method for grant-free multiple access according to claim 2, wherein the network information of the user terminal comprises long-term channel information of the user-terminal, the status information of the user terminal comprises energy information associated with energy consumed in using a unit resource block,
    and said step (b) comprises sorting user terminals based on the long-term channel information and energy information of user terminals within a serving cell and generating the candidate scheduling group sets by using the sorted user terminals.

4. The scheduling method for grant-free multiple access according to claim 2, wherein the average spectral efficiency is computed based on a spectral efficiency of each scheduling group, the spectral efficiency of each scheduling group computed based on a SINR computed for each user terminal belonging to the scheduling groups in each of the candidate scheduling group sets.

5. The scheduling method for grant-free multiple access according to claim 4, wherein the SINK for each user terminal is computed by equations shown below:

$$\tilde{\gamma}_j[f;t] = \frac{p_j^{dt}\beta_j|g_j^H\hat{h}_j|^2}{\|g_j\|^2\left(1+\sigma_{tr}^2\sum_{k\in O_q}p_k^{dt}\beta_k\right) + \sum_{k\in O_q\setminus\{j\}}p_k^{dt}\beta_k|g_j^H\hat{h}_j|^2}$$

-continued $$\gamma_k[f;t] = \frac{(1+\sigma_{tr}^2)(M-J)p_k^{dt}\beta_k}{1+\sigma_{tr}^2\Sigma_{j\in O_q}p_j^{dt}\beta_j}$$

$$= \frac{(1+\sigma_{tr}^2)(M-J)(E_k\beta_k - L\bar{p}_q^{tr})}{(N-L)+\sigma_{tr}^2(E_k\beta_k - L\bar{p}_q^{tr})}$$

where $\gamma_j[f;t]$ represents a SINR of user terminal j at sub-band f and subframe t, $\beta_j$ is long-term channel information of user terminal j, $E_k$ is energy information of k (energy consumed for each unit resource block), $p_j^{tr}$ and $p_j^{dt}$ represent transmission powers of a pilot signal and a data signal, respectively, $h_j$ is short-term channel information of user j, $g_i$ is a receive combiner of user j, $\sigma_{tr}^2$ is a variance of channel estimation error for a pilot, $O_q$ represents a q-th scheduling group, M is a number of base station antennas, N is a number symbols of a resource block, L is a length of the pilot, J is an upper limit of a number of other active users within the same scheduling group, and $\bar{p}_q^{tr}$ represents a target pilot power upon arriving at a base station for scheduling group q.

6. The scheduling method for grant-free multiple access according to claim 2, wherein said step (b) is performed for each of a plurality of candidate pilot signals having different lengths and comprises determining simultaneously a length of a pilot, a transmission power, and scheduling groups.

7. The scheduling method for grant-free multiple access according to claim 1, wherein a SINR of a user terminal belonging to the scheduling group is computed by incorporating the upper limit of the number of active users belonging to the same scheduling group.

8. The scheduling method for grant-free multiple access according to claim 1, wherein the user terminal transmits a data signal in a grant-free manner by using the allocated resources.

9. The scheduling method for grant-free multiple access according to claim 1, wherein said step (a) is performed during a cell association step.

* * * * *